July 12, 1955

A. A. STRIPLING 2,713,147

ACOUSTIC VELOCITY—ELECTRICAL RESISTANCE
CORRELATION WELL LOGGING

Filed June 29, 1953

ALLEN A. STRIPLING
INVENTOR.

BY D. Carl Richards
ATTORNEY

July 12, 1955
A. A. STRIPLING
2,713,147
ACOUSTIC VELOCITY-ELECTRICAL RESISTANCE
CORRELATION WELL LOGGING
Filed June 29, 1953
2 Sheets-Sheet 2
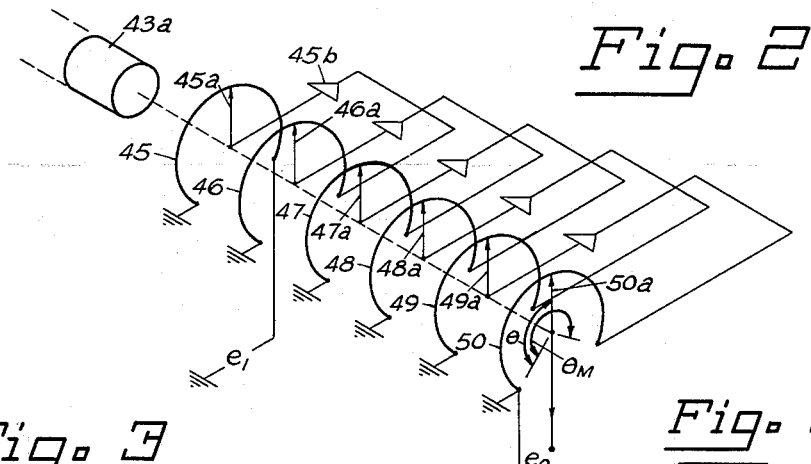
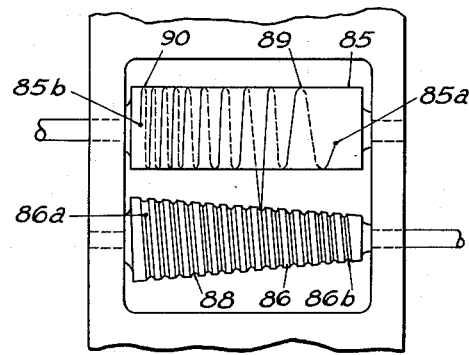
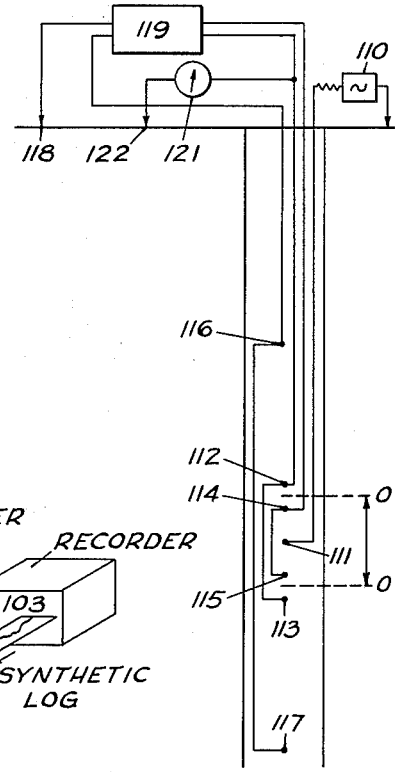
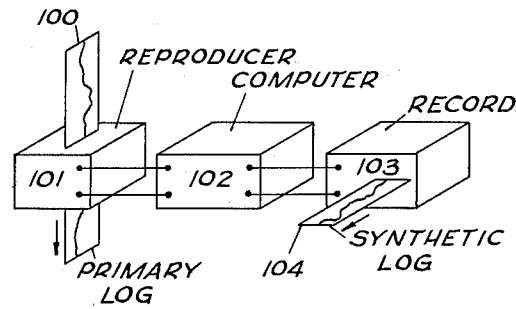
ALLEN A. STRIPLING
INVENTOR.
BY D. Carl Richards
ATTORNEY

2,713,147

ACOUSTIC VELOCITY-ELECTRICAL RESISTANCE CORRELATION WELL LOGGING

Allen A. Stripling, Dallas, Tex., assignor, by mesne assignments, to Socony-Vacuum Oil Company, Incorporated, a corporation of New York Application June 29, 1953, Serial No. 364,717

14 Claims. (Cl. 324—1)

This invention relates to well logging and more particularly to a correlation between acoustic and electrical well data.

Acoustic and electrical properties of earth formations have been measured and found to vary in a manner controlled by structural features and fluid content. In connection with the location of petroleum deposits in subsurface formations, it is important to delineate formations saturated with petroliferous liquids containing petroleum from formations containing nonpetroliferous liquids. Early efforts produced useful logs of electrical resistance and the spontaneous potentials encountered in a well bore both now widely used. Following more recent developments a method of accurately measuring the acoustic velocity of such formations has been perfected.

In accordance with the present invention, it has been discovered that correlation between an electrical log and an acoustic log, or the lack of correlation therebetween, provides an indication as to the nature of liquids in formations in a given location or earth section penetrated by a bore hole.

In accordance with the present invention, earth formations, particularly those formations having abnormal fluid content, are delineated by generating two signals which vary as a function of depth in accordance with two earth controlled parameters, one of which is an electrical resistivity function and the other, an acoustic velocity function of the formations. A synthetic signal is generated which varies in dependence upon a power function, an assumed normal saturation of the formations, and one of the generated signals. The synthetic signal and the second of the two signals are recorded as functions of depth to indicate by departures therebetween earth sections having abnormal fluid content.

In a more specific aspect of the invention a resistivity function and a velocity function, both of which vary with depth, are correlated by producing from one of them a synthetic function derived either from the resistivity or the velocity function wherein the relationship between resistivity and velocity may be shown to be of the form $$V = K(RZ)^a \qquad (1)$$

where
$V$ is acoustic velocity;
$K$ is a constant depending upon an assumed character of fluids in the formations;
$R$ is the measured resistivity of the formations;
$Z$ is the depth; and
$a$ is a constant.

In accordance with a further aspect of the invention, a system is provided for translating a resistivity function to an equivalent acoustic velocity function, or vice versa, in order to produce a synthetic function on a basis immediately comparable to a measured function. Further, means are provided for producing a log of the difference between a measured and a synthetic function.

For a further understanding of the present invention and for further objects and advantages thereof, reference may now be had to the following description taken in conjunction with the accompanying drawings in which:

Fig. 1 diagrammatically illustrates a system for derivation of a synthetic log;

Fig. 2 illustrates in greater detail operation of a portion of the system of Fig. 1;

Fig. 3 illustrates a mechanical system for raising a function to a power;

Fig. 4 illustrates use of reproducible logs in accordance with the present invention; and Fig. 5 illustrates an alternative form of system for obtaining a resistivity function.

Figure 1:
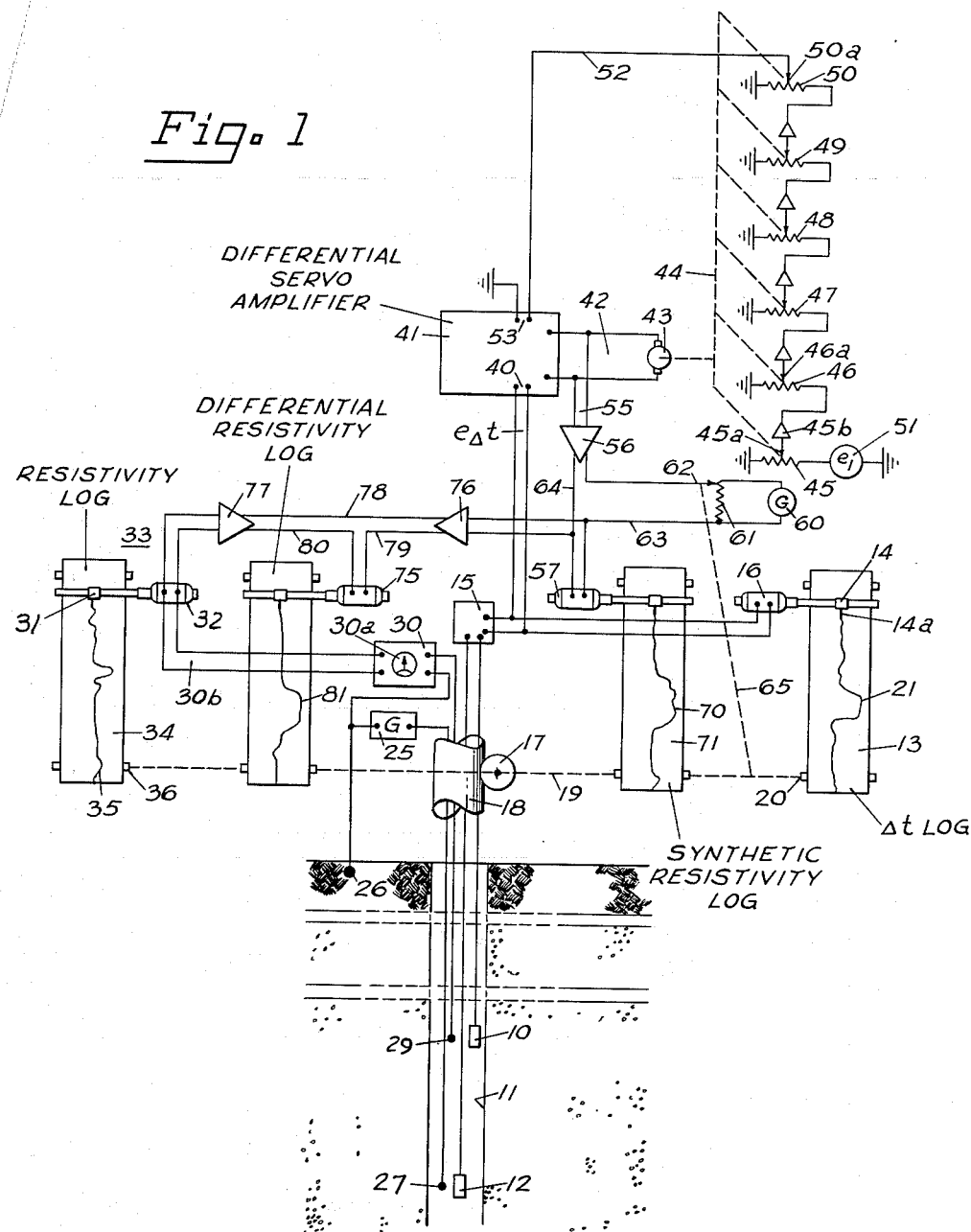

The present invention may best be appreciated if it is understood that it relates to the production of a synthetic function based upon primary data obtained by one of the two methods outlined below:

1.—VELOCITY FUNCTION

In accordance with a first method, and as described in detail in co-pending application Serial No. 192,750, now Patent No. 2,704,364, of Gerald C. Summers, a co-worker of applicant's, primary data such as the time $\Delta t$ required for an acoustic pulse to travel from a pulse source 10 positioned in a bore holl 11 through adjacent formations to a pulse receiver 12 spaced a fixed distance from source 10 is measured and plotted as a function of depth on a chart 13 by means of a suitable recording device 14. More particularly, electrical pulses from source 10 are transmitted to a translating circuit 15 upon production of each of a series of acoustic pulses from the source 10. Upon receipt of each of the acoustic pulses by receiver 12 an electrical pulse is transmitted to circuit 15. A voltage is developed at the output terminals of circuit 15 and applied to a recording drive mechanism such as a motor 16. This output voltage is maintained at all times proportional to the time interval between each pair of electrical pulses applied to circuit 15. A measuring pulley 17 actuated by cable 18, which supports pulser 10 and receiver 12, is coupled as generically illustrated by the dotted line 19 to the chart drive shaft 20 to move chart 13 past a recording pen 14a in dependence upon movement of the pulser 10 and receiver 12 along the length of the bore hole. Thus, there is produced a line graph 21 which shows variations in incremental acoustic travel time ($\Delta t$) as a function of bore hole depth.

2, RESISTIVITY FUNCTION

The second method of logging to obtain primary data involves measurement of the electrical resistivity of the adjacent formations. Of the several different specific procedures for making such measurements, the system shown in Fig. 1 is suitable and involves passing current from a generator 25 through the earth between a surface electrode 26 positioned near the mouth of the bore hole 11 and a second electrode 27 movably supported in the bore hole. The current between electrodes 26 and 27 is maintained constant by control of generator 25. The voltage appearing between detecting electrode 29 and the surface electrode 26 due to such current flow is applied to a metering circuit 30. The foregoing is known as a "long normal" electrode configuration in which variations in the resistance of formations penetrated by bore hole 11 then appear as variations in the voltage applied to produce an indication on meter 30a. A voltage suitable for driving a chart recording mechanism 31 is thus developed and applied by way of channel 30b to the drive motor 32 of a chart recorder 33. There is thus produced on chart 34 a line graph 35 of electrical earth resistance which shows resistivity variations as a function of depth. The drive shaft 36 for chart 34 is coupled to measuring pulley 17 so that the depth scale corresponds with the depth scale on chart 34.

The foregoing briefly describes representative methods of measuring the acoustic velocity function (incremental travel time) of earth formations penetrated by a bore hole and for measuring an electrical resistivity function. The foregoing is to be taken as suggestive of suitable systems and not by way of limitation. The present invention contemplates utilization of data such as appears on the $\Delta t$ log chart 13 and the resistivity log chart 34 so long as they are compatible under the conditions hereinafter set forth.

It has been found that for normal conditions as to fluid content of formations penetrated by the bore hole there is an empirical relationship between the line graphs 21 and 35 that may be derived from the Equation 1, namely $$R = \frac{K}{Z}(\Delta t)^a \qquad (2)$$

where $\Delta t$ is a velocity function, specifically the incremental travel time function corresponding with line graph 21;
$R$ is electrical resistivity, specifically line graph 35;
$Z$ is the depth function, specifically the length of charts 13 and 35;
$K$ is a constant depending upon an assumed fluid condition in the formations; and
$a$ is a mathematical power function.

It has been found that if the fluid conditions in the bore hole conform precisely to the assumed normal conditions, then the data plotted on log 13 may be translated to reproduce substantially the resistivity log plotted on chart 34. It is also apparent that the resistivity log may be translated into a velocity log. That is, for normal conditions one log may be predicted from the other producing a synthetic log. However where the fluid content of the earth formations differs from the assumed normal conditions, there will be substantial divergence as illustrated by the differences between the resistivity log on chart 34 and a synthetic resistivity log, for example as shown on chart 71 predicted from the $\Delta t$ log.

If formation fluids of normal salinity are assumed and a synthetic resistivity log predicted from a $\Delta t$ log, the synthetic log will diverge in a first sense from measured values of resistivity where the measurements are made adjacent a formation saturated with a concentrated salt solution. Similarly, there will be divergence in a second and opposite sense from measurements made adjacent formations saturated with highly resistive liquids such as hydrocarbons or fresh water.

Synthetic resistivity log

There will now be described the method and a system for producing a synthetic resistivity log which is dependent upon a velocity function, the $\Delta t$ log 21, on chart 13. A value of one-sixth ($\frac{1}{6}$) will be assumed for the exponent "$a$" of Equation 2.

The $\Delta t$ function appearing as a voltage at the output terminals of circuit 15 is applied to terminals 40 of a differential servo-amplifier 41 as well as to the chart recording motor 16. The output voltage from servo-amplifier 41 appearing in channel 42 is applied to a motor 43 which is mechanically coupled, as indicated by the dotted line 44, to the variable taps on each of six potentiometers 45, 46, 47, 48, 49 and 50. Each of the potentiometers 45—50 has its left hand terminal connected to ground. The right hand terminal of potentiometer 45 is connected by way of a voltage source 51 to ground so that a fixed current flows through the potentiometer 45. The variable tap 45a is connected by way of an isolating network or stage 45b, for example a cathode follower, to the right hand terminal of the next succeeding potentiometer 46. The tap 46a similarly is connected to potentiometer 47 which in turn is connected to potentiometer 48 and thence to potentiometers 49 and 50. The tap 50a on potentiometer 50 is connected by way of conductor 52 to one of the second pair of input terminals 53 on servo-amplifier 41. The second of input terminals 53 is connected to ground. It can be shown that the voltage appearing between tap 50 and ground may be expressed by the following equation:

$$e_{50a} = e_1 \left(\frac{\theta}{\theta_m}\right)^6 \qquad (3)$$

where $\theta$ is the displacement of the variable taps on the potentiometers; and
$\theta_m$ is the maximum possible displacement of the potentiometer taps.

When the latter voltage is applied to the second input terminal of the differential servo-amplifier 41, it can then be shown that the ratio $$\frac{\theta}{\theta_m} = \left(\frac{e\Delta t}{e_1}\right)^{\frac{1}{6}}$$

In other words, the rotation of motor 43 is proportional to the sixth root of $e_{\Delta t}$. Thus there is computed one of the variables of Equation 2 from the velocity function $\Delta t$ shown as line graph 21.

The voltage driving motor 43 also is proportional to the sixth root of $e_{\Delta t}$. The latter voltage is connected by way of channel 55 and isolating stage or network 56 to a recording drive motor 57. A voltage is added to the output of network 56 from a second source 60. Source 60 is connected in series with a potentiometer 61. One output conductor from network 56 is connected to the variable tap 62 on potentiometer 61. The fixed tap on potentiometer 61 is connected by way of conductor 63 to one terminal of motor 57. The second output conductor 64 from network 56 is connected directly to the second terminal of motor 57.

The variable tap 62 on potentiometer 61 is driven in direct proportion to the depth of the associated exploring instruments in bore hole 11 as indicated by the mechanical coupling, the dotted line 65. Thus there is added to the output of network 56 a voltage which decreases linearly as the depth of the exploring instrument in bore hole 11 increases. By this means the second of two variables of Equation 2 is provided for actuating motor 57 so that the line graph 70 on chart 71 is a synthetic resistivity log based upon (1) the velocity function, $\Delta t$, (2) a power function, (3) a depth function and (4) an assumed normal saturation of the formations, the factor $K$ of Equation (2). For those portions of the synthetic resistivity log related to formations having normal saturation, the synthetic resistivity log conforms to within a first degree with the measured resistivity log shown on chart 34. However where there are abnormal or anomalous fluid conditions in the bore hole, there will be divergence between the two logs. While as illustrated there are points of noticeable divergence, a differential resistivity log, a log of the differences between a measured and a synthetic resistivity log, more clearly emphasizes those differences.

Differential resistivity log

Having obtained a synthetic resistivity function and a measured resistivity function, a differential resistivity function may then be obtained by combining the voltages in opposite senses and applying the algebraic sum to a fourth recorder drive motor 75. More particularly, the voltage applied to motor 57, the synthetic resistivity function, is connected to an isolating stage or network 76. Similarly, the measured resistivity function applied to motor 32 is also applied to an isolating stage or network 77. Conductor 78 directly interconnects one output terminal of each of networks 76 and 77. Conductor 79 is connected between the second output terminal of network 76 and one terminal of motor 75. Conductor 80 is connected to the second output terminal of network 77 and to the second terminal of motor 75. The voltages at the outputs of networks 76 and 77 are thus phased and sensed as to be in opposition so that the differences between the voltages are effective in driving motor 75 thereby to produce a line graph 81 truly representative of the differences between line graphs 70 and 35. It will thus be seen that the divergences from a central zero line are readily related to the apparent differences in the line graphs 70 and 35.

In Fig. 2 the potentiometer system used for extracting the sixth root of the $\Delta t$ function has been illustrated in greater detail. A shaft $43a$, for example the shaft of motor 43, is directly connected to each of the taps $45a$—$50a$ of the potentiometers 45—50. Each of the potentiometers is connected at one extremity to ground. Each variable tap is connected through an isolating network, such as network $45b$, to the extremity of the next succeeding potentiometer. The related angles $\theta$ and $\theta_m$ determine the nature of the output. If an input voltage $e_1$ is applied to potentiometer 45, then the voltage $e_0$ is proportional to the sixth power of the ratio of $$\frac{\theta}{\theta_m}$$

This basic system may be used either to raise one of the desired functions to a power or to extract a root of one of the desired functions and is essentially an electromechanical computing network that is used as an element of the system of Fig. 1 to extract the sixth root of the $\Delta t$ function. If desired, the same system may be utilized to raise a resistivity function to the sixth power in the production of a synthetic $\Delta t$ log, a process exactly the reverse of that above described in the production of a synthetic resistivity log. Using the system of Fig. 2 as an element in producing a synthetic $\Delta t$ log, the angle $\theta$ must be varied in proportion to the product of the resistivity function and a linearly increasing depth function in a manner well understood by those skilled in the art.

Fig. 3 illustrates a mechanical system for obtaining a power or a root from a given function and comprises a pair of rollers 85 and 86 rotatably mounted in a housing 87. The first roller 85 is simply a cylinder of a selected diameter. The roller 86 is a cone shaped member having a spiral groove 88 cut in the surface thereof. A pair of cords or cables 89 and 90 of equal length are wound on the two rollers 85 and 86. Cord 89 is fastened at one extremity at point $85a$ on roller 85 and at its other extremity at point $86a$ on roller 86. Cord 90 is fastened at one extremity at point $85b$ on roller 85 and at the other extremity at point $86b$ on roller 86. By properly selecting the slope or the change in radius per unit length of the roller 86, the output from the shaft of roller 85 may be a selected power function of the input rotation of the shaft of roller 86. For a more detailed description of the operation of the mechanical system for obtaining a power or a root of a function, reference may be had to "Computing Mechanisms and Linkages" by Svoboda, volume 27, M. I. T. Radiation Series, McGraw-Hill, 1948, page 21 et seq.

Referring now to Fig. 4, a system is illustrated which utilizes a phonographically reproducible primary log, either a resistivity log or a $\Delta t$ log, for the production of a synthetic log. The primary log 100 is passed through a reproducer 101, and an output signal proportional to the function recorded on the primary log is applied to a computer 102 whose output in turn is applied to a recorder 103 to produce the synthetic log 104. The reproducer 101 and recorder 103 may be of any type well known in the art. The computer may be of the type above described in connection with Fig. 1 or any equivalent device for carrying out the computations indicated by Equations 1 or 2 for predicting a resistivity function from a velocity function or a velocity function from the resistivity function.

It will thus be seen that there may be produced in one operation as a logging technique a resistivity log, a $\Delta t$ log, a synthetic resistivity log and a differential resistivity log. A single bore hole exploring unit may be provided carrying the electrodes 27 and 29 along with acoustic transducers 10 and 12 simultaneously to probe the formations electrically and acoustically. Alternatively an acoustic logging tool alone may be utilized to produce a log of a velocity function and simultaneously to produce a synthetic resistivity function which itself may be a useful log and which may be compared with previously existing measured resistivity logs from the same bore hole. Further, resistivity functions and velocity functions previously measured by field techniques in the course of logging a bore hole may be utilized in connection with record playback techniques or other function generating devices to produce a synthetic log from already existing logs thereby more completely to describe the nature of the formations earlier logged.

Further it will be readily understood that all of the manipulative steps capable of being carried out by the apparatus as above described can be done by hand, utilizing as a basis of computations the Equations 1 or 2 in order to produce the synthetic functions and differential functions.

While in Fig. 1 a "long normal" electrode configuration has been illustrative, it will be understood that other configurations may be preferred in certain regions or areas where experience has proved them to yield resistivity measurements which more nearly conform to actual resistivity of the formations than obtainable through the use of "long normal." Various multi-electrode systems are well known in the art. For example the seven-electrode system illustrated in Fig. 5 will be found preferable for use in logging bore holes wherein the drilling fluids are of low resistance, for example where cut by salt water and the like. While operation of the seven-electrode system, commonly referred to in the well logging art as the "Laterolog," has been described in detail, "Journal of Petroleum Technology" volume 192 (1951) at page 305, the features most pertinent to the present invention have been shown in Fig. 5. An A. C. current of constant intensity is fed from a source 110 to a bore hole electrode 111. Electrodes 112, 113 and 114, 115 on the one hand and the monitoring electrodes 116, 117 and a surface electrode 118 are connected respectively to the input and output terminals of an automatic control apparatus 119. By this means a current is fed through electrodes 116 and 117 which continuously acts to maintain the difference of potential between electrodes 112, 113 and 114, 115 equal to zero. The common potential of electrodes 112, 113, 114, 115 is recorded by means of meter 121 or its equivalent with reference to an electrode 122. By this means the sensed parameter is dependent upon current flowing within a substantially horizontal sheet of space whose thickness is approximately equal to the spacing 0—0.

In practice Laterologs are currently run with the spacing 0—0 of 32" with electrode 111 at the mid-point. When using such a spacing in accordance with the present invention, it will be preferred that acoustic transducers utilized in connection with the procurement of a velocity function be spaced approximately the distance 0—0.

On the other hand in instances where drilling fluids are of high resistivity, for example where the drilling fluid is an oil base mud, the measurement of the resistivity function preferably will be made through use of an inductive system and more specifically one in which the conductivity, the reciprocal of resistivity, is the measured parameter. By induction measurements formation conductivity may readily be measured without being masked by the highly resistive drilling fluids. A suitable system for logging conductivity as the electrical function is illustrated and described in detail in United States Patent No. 2,535,666 to Robert A. Broding, a co-worker of applicant.

In accordance with the Broding system an elongated solenoid forms one arm of a bridge network and is electromagnetically coupled to the adjacent formations. The conductivity of the formations is one of two factors that is readily measured in the bridge network. For details of operation of such system, reference should be had to the Broding patent. However in accordance with the present invention, it should be noted that the length of the coil utilized for measuring conductivity controlling the effective penetration in the measurement of electrical resistivity by the system shown in Fig. 1 should be approximately equal to the separation between the acoustic transducers used, for example the separation between transducers 10 and 12 of Fig. 1. Similarly if the "long normal" electrode configuration of Fig. 1 is to be utilized, the two bore hole electrodes 27 and 29 should be spaced approximately the same distance apart as the acoustic transducers 10 and 12.

While a continuous acoustic well logging system would be much preferred for use in obtaining a log of a velocity function, other suitable methods may be utilized. For example incremental travel times may be obtained in the manner generically illustrated and described in Patent No. 2,503,904 to Dahm, particularly to procedure outlined in connection with Fig. 6 wherein a plurality of detectors are positioned at spaced points along the length of a bore hole and a single acoustic impulse is produced by detonation of an explosive charge above or below the spaced detectors. The arrival times of the acoustic energy at the various detectors provide a ready indication of the incremental travel times along the section spanned by the array of detectors. This procedure generally is well understood by those skilled in the art and would be found entirely adequate for producing a velocity function suitable for utilization in the production of a synthetic log as above outlined.

While the invention has been described and certain modifications of apparatus suitable for carrying out the invention have been set forth in detail, it is to be understood that further modifications may now suggest themselves to those skilled in the art and it is intended to cover such modifications as fall within the scope of the appended claims.

What is claimed is:

1. The method of locating sections of earth formations having abnormal fluid content which comprises generating two electrical signals which vary in relation to depth below the earth's surface in accordance with two earth parameters one of which is an electrical resistivity function of the formations and the other an acoustic velocity function of said formations, generating a synthetic signal in dependence upon a mathematical power function, an assumed normal fluid saturation of the formations and one of said electrical signals, and recording as a function of depth of said formations said synthetic signal and the other of said electrical signals to indicate by departures therebetween the sections having said abnormal fluid saturation.

2. The method of locating sections of earth formations having abnormal fluid content which comprises generating two electrical signals which vary as a function of depth below the earth's surface in accordance with two earth controlled parameters one of which is the electrical resistivity of the formations and the other an acoustic velocity function of said formations, simultaneously generating a synthetic signal in dependence upon a mathematical power function, an assumed normal fluid saturation of the formations and one of said electrical signals, and recording as functions of depth said synthetic signal and the other of said electrical signals to indicate by departures therebetween the sections having said abnormal fluid saturation.

3. The method of locating sections of earth formations having abnormal fluid content which comprises generating two electrical signals which vary as a function of depth below the earth's surface in accordance with two earth parameters one of which is the electrical resistivity of the formations and the other an acoustic velocity function of said formations, generating a synthetic signal in dependence upon a mathematical power function, an assumed normal fluid saturation of the formations and one of said electrical signals, and recording the difference between the other of said electrical signals and said synthetic signal as a function of depth.

4. The method of locating sections of earth formations having abnormal fluid content which comprises generating two electrical signals which vary as a function of depth below the earth's surface in accordance with two earth parameters one of which is the electrical resistivity of the formations and the other an acoustic velocity function of said formations, simultaneously generating a synthetic signal in dependence upon a mathematical power function, an assumed normal fluid saturation of the formations and one of said electrical signals, and recording the difference between the other of said electrical signals and said synthetic signal as a function of depth.

5. The method of producing a log of a well bore in which variations in two physical properties, electrical resistance and acoustic velocity of the formations, are encountered at various depths along the well bore which comprises generating a first electrical signal which varies along a scale proportional to depth below the earth's surface in direct relation to one of said two properties, simultaneously generating a synthetic signal which nominally corresponds with the other of said two properties in dependence upon a mathematical power function, an assumed normal fluid saturation of the formations and said first signal, and recording said synthetic signal as a function of depth whereby differences between said recorded signal and a log of said second property directly indicate earth sections having abnormal fluid saturation.

6. The method of producing a log of a well bore in which variations in two physical properties, electrical resistivity and acoustic velocity of the formations are encountered at various depths along the well bore which comprises generating an electrical signal which varies along a scale proportional to depth below the earth's surface in direct relation to said electrical resistivity, simultaneously generating a synthetic signal which nominally corresponds with said acoustic velocity in the relationship, synthetic velocity signal$=K(RZ)^a$ where: K is a constant dependent upon an assumed normal fluid saturation of the formations; R is said first signal; Z is depth and $a$ is a constant, and recording said synthetic velocity signal as a function of depth whereby differences between said recorded signal and a log of said second property indicate earth sections having abnormal fluid saturation.

7. The method of producing a log of a well bore in which variations in two physical properties, electrical resistivity and acoustic velocity of the formations, are encountered at various depths along the well bore which comprises generating an electrical signal which varies along scale proportional to depth below the surface of the earth in dependence upon said acoustic velocity, simultaneously generating a synthetic signal which nominally corresponds with said resistivity in the relationship, $$\text{synthetic resistivity signal}=\frac{K}{Z}V^{\frac{1}{a}}$$

where: K is a constant dependent upon an assumed normal fluid saturation of the formations, V is said first signal, Z is depth and $a$ is a constant, and recording said synthetic resistivity signal as a function of depth whereby differences between said recorded signal and a log of said second porperty indicate earth sections having abnormal fluid saturation.

8. A system fgor locating sections of earth formations having abnormal fluid content which comprises bore hole sensing means for generating two electrical signals which vary in relation to depth below the surface of the earth in accordance with two earth parameters one of which is an electrical resistivity function of the formation and the other an acoustic velocity function of said formation, means coupled to said bore hole sensing system including a mathematical power function generator for generating a synthetic signal in dependence upon said mathematical power function and one of said electrical signals, means for modifying said synthetic signal in dependence upon an assumed normal fluid saturation of the formations, and means for recording said modified synthetic signal and the other of said electrical signals as a function of depth to indicate by departures therebetween earth sections of said abnormal fluid saturation.

9. A system for locating sections of earth formations having abnormal fluid content which comprises bore hole sensing means for generating two electrical signals which vary in relation to depth below the surface of the earth in accordance with two earth parameters one of which is an electrical resistivity function of the formation and the other an acoustic velocity function of said formation, means coupled to said bore hole sensing ssytem including a mathematical power function generator for generating a synthetic signal in dependence upon said mathematical power function and one of said electrical signals simultaneously with the generation of said two electrical signals, means for modifying said synthetic signal in dependence upon an assumed normal fluid saturation of the formations, and means for recording said modified synthetic signal and the other of said electrical signals as a function of depth to indicate by departures therebetween earth sections of said abnormal fluid saturation.

10. A system for locating sections of earth formations having abnormal fluid content which comprises bore hole sensing means for generating two electrical signals which vary in relation to depth below the surface of the earth in accordance with two earth parameters one of which is an electrical resistivity function of the formation and the other an acoustic velocity function of said formation, means coupled to said bore hole sensing system including a mathematical power function generator for generating a synthetic signal in dependence upon said mathematical power function and one of said electrical signals, means for modifying said synthetic signal in dependence upon an assumed normal fluid saturation of the formations, and means coupled to said bore hole sensing system and to said modifying means for recording the difference between said modified synthetic signal and the other of said electrical signals as a function of bore hole depth to indicate by departures therebetween earth sections of said abnormal fluid saturation.

11. A system for locating sections of earth formations having abnormal fluid content which comprises bore hole sensing means for generating two electrical signals which vary in relation to depth below the surface of the earth in accordance with two earth parameters one of which is an electrical resistivity function of the formation and the other an acoustic velocity function of said formation, means coupled to said bore hole sensing system including a mathematical power function generator for generating a synthetic signal in dependence upon said mathematical power function and one of said two electrical signals simultaneously with the generation of said two electrical signals, means for modifying said synthetic signal in dependence upon an assumed normal fluid saturation of the formation, and means coupled to said bore hole sensing system and to said modifying means for recording the difference between said modified synthetic signal and the other of said two electrical signals as a function of bore hole depth to indicate by departures therebetween earth sections of said abnormal fluid saturation.

12. A system for producing a log of a well bore in which variations in two physical properties, electrical resistance and acoustic velocity of the formations, are encountered which comprises bore hole sensing means for generating an electrical signal which varies in relation to depth below the surface of the earth in accordance with one of said two properties, means coupled to said bore hole sensing system including a mathematical power function generating means for generating a synthetic signal in dependence upon said mathematical power function and said signal, means for modifying said synthetic signal in dependence upon an assumed normal fluid saturation of the formations, and means for recording said modified synthetic signal as a function of depth whereby differences between said recorded signal and a log of the other of said two physical properties directly indicate earth sections having abnormal fluid saturation.

13. A system for producing a log of a well bore related to the values of two physical properties, electrical resistance and acoustic velocity of the formations, which comprises sensing means for generating a first electrical signal which varies in relation to depth in said well bore in accordance with one of said two properties, means including a mathematical power function generating means for generating a synthetic signal in dependence upon said mathematical power function and said first signal, means for modifying said synthetic signal in dependence upon an assumed normal fluid saturation of said formations, and means for measuring differences between the values of the modified synthetic signal at points along said well bore and values of the other of said two properties at corresponding points for directly indicating earth sections having abnormal fluid saturation.

14. A system for producing a log of a well bore related to the values of two physical properties, electrical resistance and acoustic velocity of the formations, which comprises bore hole sensing means for generating a first electrical signal which varies in relation to bore hole depth in accordance with the one of said two properties, means coupled to said bore hole sensing means including a mathematical power function generating means for generating a synthetic signal in dependence upon said mathematical power function and said first signal, means for modifying said synthetic signal in dependence upon an assumed normal fluid saturation of said formations, and means coupled to said modifying means for measuring differences between the values of the modified synthetic signal at points related to different depths of said sensing means and values of the other of said two properties at corresponding points for directly indicating earth sections having abnormal fluid saturation.

No references cited.